United States Patent
Knoche et al.

(10) Patent No.: US 10,308,548 B2
(45) Date of Patent: Jun. 4, 2019

(54) GLASS OR GLASS CERAMIC SUBSTRATE PROVIDED WITH A DECORATIVE COATING AND METHOD FOR PRODUCING SAME

(71) Applicant: SCHOTT AG, Mainz (DE)

(72) Inventors: Silke Knoche, Saulheim (DE); Angelina Milanovska, Mainz (DE); Lutz Klippe, Wiesbaden (DE); Ulf Hoffmann, Pfungstadt (DE); Ella Ruhl, Bad Kreuznach (DE)

(73) Assignee: SCHOTT AG, Mainz (DE)

( * ) Notice: Subject to any disclaimer, the term of this patent is extended or adjusted under 35 U.S.C. 154(b) by 1252 days.

(21) Appl. No.: 14/518,456

(22) Filed: Oct. 20, 2014

(65) Prior Publication Data
US 2015/0037539 A1 Feb. 5, 2015

Related U.S. Application Data (63) Continuation of application No. PCT/EP2013/058224, filed on Apr. 19, 2013.

(30) Foreign Application Priority Data

Apr. 20, 2012 (DE) .................... 10 2012 103 507
Oct. 15, 2012 (DE) .................... 10 2012 109 808

(51) Int. Cl.
*C03C 17/42* (2006.01)
*B05D 1/36* (2006.01)
(Continued)

(52) U.S. Cl.
CPC .............. *C03C 17/42* (2013.01); *B05D 1/36* (2013.01); *B05D 5/06* (2013.01); *B05D 7/52* (2013.01);
(Continued)

(58) Field of Classification Search
CPC ....... C03C 17/32; C03C 17/42; C03C 17/008; B05D 1/36; B05D 7/52
See application file for complete search history.

(56) References Cited

U.S. PATENT DOCUMENTS 5,718,963 A 2/1998 Batzar
6,660,980 B2 * 12/2003 Nagata .................... H05B 3/74
219/452.12
(Continued)

FOREIGN PATENT DOCUMENTS

CN 101415653 4/2009
DE 10163646 7/2003
(Continued)

OTHER PUBLICATIONS

Product Information—CI Pigment Black 27—Iron Cobalt Chromite Black Spinel, FERRO Apr. 2004, 1 page.
(Continued)

*Primary Examiner* — Xiao S Zhao
(74) *Attorney, Agent, or Firm* — Ohlandt, Greeley, Ruggiero & Perle, L.L.P.

(57) ABSTRACT

Glass or glass ceramic substrates are provided that have a decorative coating. Methods for coating a glass or glass ceramic substrate with a decorative coating are also provided. In the method, a first, textured layer is applied which is filled with a further layer, so that a layer material of graded composition is formed.

19 Claims, 10 Drawing Sheets

(51) Int. Cl.
  *B05D 7/00* (2006.01)
  *B05D 5/06* (2006.01)
  *C03C 17/32* (2006.01)
  *C03C 17/00* (2006.01)
  *F24C 15/10* (2006.01)
  *F24C 15/02* (2006.01)

(52) U.S. Cl.
  CPC ............ *C03C 17/008* (2013.01); *C03C 17/32* (2013.01); *C03C 2217/425* (2013.01); *C03C 2217/485* (2013.01); *C03C 2217/72* (2013.01); *C03C 2218/36* (2013.01); *F24C 15/02* (2013.01); *F24C 15/10* (2013.01); *Y10T 428/24364* (2015.01)

(56) References Cited

U.S. PATENT DOCUMENTS

| | | | |
|---|---|---|---|
| 7,380,415 | B2* | 6/2008 | Cotlear De Witzmann ................ C03C 8/14 65/33.4 |
| 2004/0091718 | A1 | 5/2004 | Striegler |
| 2005/0129959 | A1 | 6/2005 | Roemer-Scheuermann |
| 2008/0233355 | A1* | 9/2008 | Henze ................ C03C 17/3411 428/168 |
| 2009/0233082 | A1* | 9/2009 | Esemann ................ B44C 3/02 428/319.1 |
| 2010/0028629 | A1 | 2/2010 | Anton |
| 2010/0047556 | A1 | 2/2010 | Bockmeyer |
| 2010/0167035 | A1 | 7/2010 | Striegler |
| 2010/0219176 | A1* | 9/2010 | Striegler ................ C03C 17/02 219/443.1 |
| 2012/0067865 | A1 | 3/2012 | Siebers |
| 2012/0295081 | A1* | 11/2012 | Henze ..................... C03C 1/008 428/201 |
| 2013/0115445 | A1 | 5/2013 | Devaux |
| 2013/0266781 | A1 | 10/2013 | Hoffmann |
| 2015/0191392 | A1 | 7/2015 | Henze |

FOREIGN PATENT DOCUMENTS

| | | |
|---|---|---|
| DE | 10355160 | 6/2005 |
| DE | 202004015925 U1 | 11/2005 |
| DE | 102010004741 | 7/2011 |
| DE | 102010031866 A1 | 1/2012 |
| EP | 1416227 A2 | 5/2004 |
| EP | 1435759 B1 | 7/2004 |
| EP | 2141133 | 1/2010 |
| EP | 2141134 | 1/2010 |
| JP | 2010009958 | 1/2010 |
| JP | 2011216457 | 10/2011 |
| WO | 9727149 | 7/1997 |
| WO | 2006111369 A1 | 10/2006 |
| WO | 2007104752 A1 | 9/2007 |
| WO | 2010/081531 A1 | 7/2010 |
| WO | WO 2011/085996 * 7/2011 .............. C03C 1/00 |
| WO | 2012004337 A1 | 1/2012 |

OTHER PUBLICATIONS

Web page from www.chemicalbook.com, Iron Cobalt Chromite Black Spinel, Jan. 15, 2018, 1 page.
International Search Report of the International Search Authority dated Jul. 8, 2013 for corresponding International Application No. PCT/EP2013/058224 with English translation, 6 pages.
Written Opinion of the International Search Authority dated Jul. 8, 2013 for corresponding International Application No. PCT/EP2013/058224 with English translation, 8 pages.
German Office Action dated Nov. 15, 2012 for corresponding German Application No. 10 2012 103 507.5 with English translation, 8 pages.
International Preliminary Report on Patentability dated Oct. 21, 2014 for corresponding International Application No. PCT/EP2013/058224 with English translation, 10 pages.
International Search Report dated Jul. 5, 2013 for corresponding International Patent Application No. PCT/EP2013/058218 with English translation, 6 pages.
English translation of the Written Opinion of the International Searching Authority dated Jul. 5, 2013 for corresponding International Patent Application No. PCT/EP2013/058218, 4 pages.
English translation of the International Preliminary Report on Patentability dated Oct. 21, 2014 for corresponding International Patent Application No. PCT/EP2013/058218, 5 pages.

* cited by examiner

GLASS OR GLASS CERAMIC SUBSTRATE PROVIDED WITH A DECORATIVE COATING AND METHOD FOR PRODUCING SAME

CROSS REFERENCE TO RELATED APPLICATIONS

This application is a continuation of International Application Serial No. PCT/EP2013/058224 filed Apr. 19, 2013, now pending, which claims benefit under 35 U.S.C. §119(a) of German Patent Application No. 10 2012 103 507.5 filed on Apr. 20, 2012 and German Patent Application No. 10 2012 109 808.5 filed on Oct. 15, 2012, the entire contents of all of which are incorporated herein by reference.

BACKGROUND

1. Field of the Invention

The invention relates to a method for producing a decorative coating on a glass or glass ceramic substrate and to a glass or glass ceramic substrate produced according to such method. More particularly, the invention relates to a glass ceramic cooktop having a bottom surface coating.

2. Description of Related Art

Glass and glass ceramic substrates with a decorative coating are known from practice. A problem with such coatings is that the layer system is subjected to high thermal loads. When used for induction cooktops, for example, the coatings have to resist temperatures of up to 500° C.

A variety of ways for applying such coatings have already been known from practice.

First, it is known to deposit metallic layers using a PVD process, these layers may in particular be applied by sputtering. Sputtered layers are highly brilliant and have a metallic appearance.

A drawback, however, is that sputtering of metallic layers is quite complex. In particular if it is desired to only partially cover the substrate with a decorative layer, for example in order to mark cooking zones, additional process steps for masking are necessary.

Another drawback is due to the fact that there are only few possibilities to vary the visual appearance of the coating, in particular in terms of the desired color. For example it is very complex to apply black layers using a sputtering process.

Often, another drawback is the conductivity of the layers, which usually makes them not suitable to be arranged in front of capacitive switches.

Also known from practice are decorative coatings based on silicone paints. Although the latter may be applied comparatively easily by screen printing, the mechanical strength of such layers, however, is usually limited, and moreover, discoloration of the coating may be caused under high temperature loads.

Furthermore, it is known to apply decorative coatings by means of glass flux, i.e. enamel coatings. Such enamel coatings have the advantage that by selecting the employed pigments which are added to the glass flux material almost any color can be produced.

However, known glass flux-based coatings can usually only be applied in a limited layer thickness with the resulting opacity and are prone to cracking, which has a significant impact on the visual appearance of the layer. Furthermore, known enamel layers put the employed substrate under tension thus reducing its strength.

In order to prevent cracking and to improve the mechanical strength of the composite material produced, it is known to apply porous enamel layers. However, a drawback of these layers is that the pores are in the range of the wavelength of visible light, so that a matt appearance is caused.

EP 1 435 759 B1 describes a method for applying a decorative coating onto a cooktop, in which a dense layer containing inorganic pigments is applied to the upper surface and a porous layer containing inorganic pigments to the bottom surface. The intention therein is to avoid cracks in the bottom layer by all means.

Mechanically and thermally stable glossy enamel layers for cooktops could not be produced so far.

Also known are coatings produced by a sol-gel process in which at least one pigment or filler is added to the sol-gel material. However, in many cases such sol-gel layers are also prone to delamination or cracking, which is then manifested as a local lightening on the composite material.

Furthermore, it is known to apply luster paints as a decorative coating. A drawback with luster paints, again, is that the selection of the color location is limited and that at least for dark, especially for black coatings noble metal based paints have to be used, which involves increased manufacturing costs.

SUMMARY

The invention is based on the object to provide a method for applying a decorative coating to glass or ceramic substrates, which permits to easily provide the substrate with a heat-resistant layer.

A more particular object of the invention is to provide for free selection of the color location of the coating and for application of a glossy layer.

The object of the invention is already achieved by a method for applying a decorative coating to a glass or glass ceramic substrate and by a coated glass or glass ceramic substrate.

The invention relates to a method for applying a decorative coating to a glass or glass ceramic substrate.

A decorative coating refers to any coating that changes the visual appearance of the substrate. Preferably, the coating is opaque or semi-transparent. The coating may be of any desired color.

Preferably, a transparent and/or heat-resistant material is used as the glass or glass ceramic substrate. Besides glass ceramics which are known as so-called zero-expansion material, it is also conceivable for the invention to be employed for heat-resistant glasses. However, in the case of a cooktop application a glass ceramic substrate will usually be used. A transparent substrate refers to a substrate which is at least partially transparent in the visible range.

The substrate is preferably planar. However, it is also conceivable to use the invention for curved substrates, e.g. those used for fireplace windows.

According to the invention, a first layer having a textured surface is initially applied using a glass flux. A textured surface refers to a surface that has a surface relief. That means, the applied coating is not flat but has valleys and mountains. The texture depth is preferably in the micrometer range. In particular, a maximum texture depth from 0.1 to 5 μm, preferably from 0.2 to 3 μm, and more preferably from 0.5 to 2 μm is contemplated.

The texture depth may be determined, for example, by measuring the surface profile of a sample material along 10 randomly selected test sections of a length of 1 cm, for example by scanning electron microscopy.

The average value of the 10 maximum height differences so determined represents the maximum texture depth for the purposes of the invention.

Such a textured surface is achieved by adding pigment and/or filler particles to the material employed for the coating, as will be explained in more detail below.

A further layer is applied onto the textured first layer, which at least partially and more preferably completely fills the textured surface, so that the material of the first layer gradually merges into the material of the second layer. It is also conceivable to fill the first layer with the layer material of the second layer only in sections of the first layer.

Since the produced mountain-valley profile is filled by the material of the second layer, the material composition of the layer system comprised of the two materials changes, starting from the substrate up to the surface of the coating, in that a higher proportion of the material of the first layer is present at the surface of the substrate (preferably approximately 100%), whereas on the surface of the layer system the proportion of the material of the first layer is smaller (preferably approximately 0%).

The inventors have found that under thermal load the resulting layer system is much less prone to clearly visible changes, in particular to light stains caused by cracking.

This may be due to the fact that even if cracks are produced in the first layer, these will usually be concealed by the second layer, so that despite of existing cracking the inhomogeneities in visual appearance mentioned above do not occur.

Moreover, intended cracking may even cause a generation of zones of increased temperature resistance, which results in enhance temperature resistance of the entire layer system. This is especially true in case of a first layer produced by glass flux onto which a polymer layer is applied.

It will be understood that further layers may be present within the meaning of the invention. In particular, further covering and sealing layers are conceivable.

Also, as contemplated according to a further embodiment of the invention, it is possible for the layer system consisting of the first and the further layer to be applied onto a layer having a high texture depth of several microns. This may in particular be a layer deposited by a sol-gel process. By using such a further textured layer of high textural depth of preferably more than 10 µm, it is possible to produce patterns, haptic grip surfaces etc., for example. These may in particular be arranged on the bottom surface of a substrate, in particular of a cooktop.

Preferably, the material of the first and/or second layer comprises pigments, in particular in a proportion of more than 50% (% values always given in percent by weight, unless otherwise indicated).

In particular the layer used as the first layer preferably has a high pigment content of more than 60%.

Preferably metal oxides are used as the pigments. These may in particular include: cobalt oxides/spinels, cobalt-aluminum spinels, cobalt-titanium spinels, cobalt-chromium spinels, cobalt-nickel-manganese-iron-chromium oxides/spinels, cobalt-nickel-zinc-titanium-aluminum oxides/spinels, iron oxides, iron-chromium oxides, iron-chromium-zinc-titanium oxide, copper-chromium spinels, nickel-chromium-antimony-titanium oxides, titanium oxides, zirconium-silicon-iron oxides/spinels etc.

Moreover, any conceivable absorption pigments are also eligible as the pigments, in particular platelet- or rod-shaped pigments. It is also possible to use coated effect pigments.

Furthermore, it is possible to add fillers in particular to the first layer, which fillers may especially include: $SiO_2$ particles, alumina particles, fumed silica, soda-lime, alkali-aluminosilicate or borosilicate glass spheres, hollow glass spheres.

In combination with a high percentage of pigment particles and/or fillers, a layer with a high texture depth will be formed.

Preferably, the layer is baked at such a high temperature that the glass flux particles melt while the filler and/or pigment particles substantially remain intact, so as to obtain a dense layer having a high texture depth.

A dense layer in particular refers to a layer having a closed porosity of less than 5%.

In this way, in particular a semi-transparent rough first layer is formed, which is filled with a polymer layer as the further layer in order to provide, in combination, an opaque glossy bottom surface coating.

It is also conceivable to omit the further layer in sections in order to obtain a semi-transparent surface area in the omitted area. This semi-transparent area may in particular serve for integrating a display. In particular the use of a screen printing process for applying the further layer permits to easily produce the recessed areas.

It will be understood that the recessed area may yet contain further, third layer materials.

For example it is conceivable to apply a transparent polymer layer onto the first layer in the recessed area. Also, it is conceivable to apply a semi-transparent layer that contains other colorants than the recessed further layer. So the omitted area remains semi-transparent and may be adapted to the adjacent layer system in terms of its visual appearance.

The layer thickness of the first layer is preferably between 0.1 and 10 µm, more preferably between 1 and 5 µm. The further layer preferably has a thickness from 1 µm to 100 µm.

The maximum texture depth of the first layer is preferably more than 40%, more preferably more than 80%, and most preferably more than 90% of the maximum layer thickness.

As a glass flux material of the first layer, crystalline or glassy inorganic materials may be used.

The glass flux material is preferably provided in particulate form and is optionally mixed with the pigment and/or filler particles.

The glasses preferably used are silicate glasses such as borosilicate glasses, zinc-borosilicate glasses, bismuth-borosilicate glasses, silicon oxide glasses, zinc-silicate glasses, bismuth-silicate glasses, aluminosilicate glasses, invert glasses, or borate and phosphate glasses, such as zinc-borate glasses, bismuth-borate glasses.

The first layer is preferably baked at a temperature of more than 500° C., most preferably of more than 600° C.

"Baking" in the meaning of the invention refers to curing of the coating material. In the case of a glass flux, the material is in particular baked at such a high temperature that the glass flux material melts and does not only sinter.

The heating is preferably performed so rapidly and temporarily that the glass flux material densifies without bringing about any evaporation processes to occur, which might cause pore formation. However, the glass flux material has to be that fluid that it completely wets the settled pigment particles and/or fillers.

The layer material used for the further layer is preferably a polymer. In particular a polysiloxane, polysilsesquioxane, polyurethane, epoxy- and/or polyester-functionalized silicone resins, or a sol-gel may be used.

Preferably, the further layer is also mixed with pigments, in particular inorganic pigments and/or fillers and/or organic colorants.

The fillers used include in particular silica particles, alumina particles, fumed silica, soda-lime, alkali-alumosilicate or borosilicate glass spheres, hollow glass spheres.

Pigments that come into consideration include any conceivable absorption pigments, in particular platelet- or rod-shaped pigments.

It is also conceivable to use coated effect pigments.

Colorants that may be used include any organic colorants which are sufficiently temperature stable.

In particular for the display area, transparent layer material may be used for the second layer, which may however even be colorized in order to reduce the color contrast between the opaque part and the display area. For coloring the layer, various coloring agents may be used which provide a semi-transparent coating with low scattering.

For example organic colorants may be added to the coating material. For a dark or black coating, in particular Orasol® RLi may be used. Temperature resistant colorants that are also suitable include azo dyes such as methyl orange, alizarin yellow or Congo red; triphenylmethane dyes such as malachite green, eosin, fluorescein, aurin, and phenolphthalein; Vat dyes such as anthraquinone dyes, indigo, and thioindigo; fluorescent dyes; perylene dyes.

Also, phthalocyanines with e.g. Cr, Cu, Ni, Zn, or Co as the central atom may be employed.

Through the use of a polymeric layer which by filling up the texture of the first layer forms a layer system of a graded composition, a dense, optionally glossy, thermally highly resistant layer system is obtained. This resulting gradient layer has a porosity of less than 7 vol % and is thus dense. This value can be determined in a cross section. Nitrogen sorption according to BET reveals surface areas of the layer system of less than 5 $m^2/g$, which again is evidence of a dense gradient composite.

The invention in particular permits in a very simple way to produce black glossy layers of high thermal resistance. The layers are in particular resistant to a short-term temperature load of more than 500° C. and to a long-term exposure to more than 400° C.

Surprisingly, black layers can be produced by combining a first and a further layer, which when individually applied each have a lightness L in the Lab color space of more than 29.0. That means, these layers are rather gray and do not exhibit the desired black color appearance.

Surprisingly, a combination of these layers results in a lightness L of less than 28.0, in particular less than 27.0.

Heretofore, high cost noble metal oxides were necessary to provide such dark heat-resistant layers which, in addition, had a slightly brownish color deviation.

The application of the layer material of the first and/or further layer is preferably accomplished using a printing technique, in particular by screen printing.

In this manner, even large area substrates can be completely coated very easily and rapidly.

At the same time, the use of a screen printing process permits to only partially coat the substrate. That means, it is possible to print only certain areas while other areas are left out. In case of a cooktop, in particular the display areas or the hobs may be left out.

Moreover, even combinations of multi-colored top and bottom coatings are possible.

The invention further relates to a coated glass or glass ceramic substrate which can be produced as described above.

With the invention it was possible to provide a glossy coating which in particular shines with a gloss level of G1 according to EN ISO 2813. It will be understood that for the bottom surface coating the gloss level considered is that as seen from the side of the substrate.

DETAILED DESCRIPTION

The invention will now be described with reference to the drawings of FIGS. 1 to 14.

Figure 1:
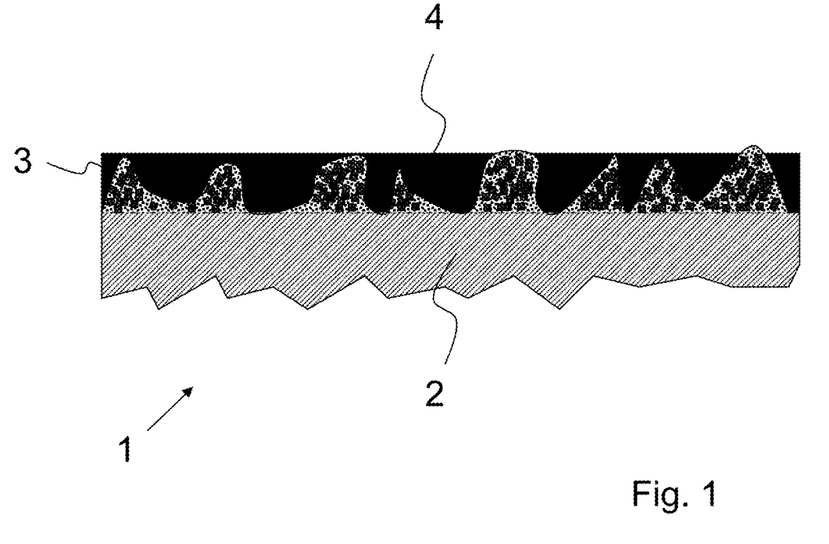
FIG. 1 is a schematic cross-sectional view of the glass or glass ceramic of the present disclosure.

FIG. 1 is a schematic cross-sectional view which serves to illustrate the effect of the invention.

A coated glass or glass ceramic substrate 1 can be seen which consists of the substrate 2 and a gradient layer.

The gradient layer comprises a first layer 3 applied using a glass flux, which layer contains more than 60% of pigment particles and small filler particles.

Due to the presence of the pigment particles which form randomly distributed valleys and mountains, a textured surface is formed which is filled with a polysiloxane layer as a further layer 4. The further layer 4 also contains pigment particles. The gradient layer is used as a bottom surface coating, that means the viewer will look at the gradient layer from the side opposite layers 3 and 4.

The gradient layer is preferably black and glossy.

In more detail, layers may be applied as described in the examples below.

The layer material used for the first layer has a composition according to component A, and the further layer has a composition according to component B.

For the matrix material of component A, in particular crystalline and/or glassy inorganic materials can be used.

Preferably, these basic glasses may be of siliceous origin, such as e.g. borosilicate glasses, fused silica glasses, zinc-silicate glasses, zinc-borosilicate glasses, bismuth-silicate glasses, bismuth-borosilicate glasses, alumosilicate glasses, soda-lime glasses, or borate, zinc-borate, bismuth-borate glasses, or phosphate glasses, and invert glasses.

These may include, for example, glasses of the following composition:

Borosilicate Glass:
$SiO_2$: 45-85 wt %
$B_2O_3$: 5-30 wt %
$Al_2O_3$: 2-20 wt %
$R_2O$: 2-20 wt, $R_2O$ representing alkali oxides
RO: 0-10 wt %, RO representing alkaline earth oxides
$RO_2$: 0-5 wt %, $RO_2$ representing $TiO_2$ and/or $ZrO_2$
ZnO: 0-15 wt %.

Zinc-Borate Glasses:
$SiO_2$: 10-45 wt %
$B_2O_3$: 5-30 wt %
$Al_2O_3$: 0-10 wt %
$R_2O$: 0-10 wt %, $R_2O$ representing alkali oxides
RO: 0-25 wt %, RO representing alkaline earth oxides
$RO_2$: 0-10 wt %, $RO_2$ representing $TiO_2$ and/or $ZrO_2$
ZnO: 10-70 wt %.

A coated glass or glass-ceramic substrate may be produced in detail with reference to the following examples:

EXAMPLE 1

Component A is applied to the bottom surface of a transparent glass ceramic plate of the type CERAN CLEARTRANS® (size 250×300 mm, thickness 4 mm) over the entire surface by screen printing (180 mesh screen), and is baked at 725° C. for 10 min in a continuous furnace. Component A comprises 35% of zinc-borosilicate glass (softening point $T_s$ of 575° C.) and 65% of a black pigment (Cu—Cr spinel; $CuCr_2O_4$), both components having a grain size of D50<5 µm.

Component A baked in this manner has a layer thickness of 1.8 µm, a smooth haptic perception, is dense and non-porous (a dried water droplet can be wiped off), is gray (results of color measuring device Datacolor: L=29.9; a=−0.4; b=0.4), and semi-transparent (transmittance at 550 nm: 11%).

In order to determine the scattering of the layer, a sample was measured in a spectrometer "Lambda 900" from company Perkin Ellmer, with and without Ulbricht sphere. At a wavelength of 550 nm, the transmittance was 11% with Ulbricht sphere and 1% without sphere, which means the sample exhibits a high level of scattered light.

Subsequently, component B1 which forms the further layer is applied on component A by screen printing, also to the entire surface area.

A black silicone paint is used as the component B1, for example that described in published patent application DE 10 2010 031 866 A1. This paint is printed using a 77 mesh screen, and is then dried at 200° C. for 45 min.

The resulting component B1 has a layer thickness of 11 µm and is gray when printed alone (L=30.8; a=−0.25; b=−1.2).

The gradient layer resulting from component A and component B1, however, is smooth, dense, deep black (L=26.7; a=−0.1; b=−0.7) and glossy when viewed through the glass ceramic (i.e. viewed from the upper side); transmittance in the entire visible range is 0% (transmission measurement with and without Ulbricht sphere). The spectrometer "Lambda 950" from company Perkin Ellmer was used to measure both the individual layer of component A and the gradient layer including components A and B1 in reflection. The difference in haze values is 5.5%, that means the reflection measurements confirmed that the layer consisting of component A has a high scattering power, while the gradient composite exhibits almost no scattering behavior.

The gradient layer so produced, consisting of the materials of components A and B, meets the requirements for a cooktop with a short-term temperature load of up to 500° C.

In detail, component B1 may have a composition as follows:

60-80 wt % polydimethylsiloxane
10-40 wt % black pigment, in particular selected from the group comprising (Cr,Fe)(Ni,Mn) spinel; $Cu(Cr,Fe,Mn)_2O_4$ spinel (black 28); $Co(Cr,Fe)_2O_4$ (black 27); (Ni,Fe)(Cr,Fe)$O_4$ spinel (black 30); $(Fe,Mn)_2O_3$ (black 33); (Fe,Mn)(Fe,Mn)$_2O_4$ spinel (black 26); and $(Cu,Cr)O_x$ (black 28)
5-15 wt % graphite with a D90 value between 5 and 20 µm. (both synthetic and non-synthetic).

EXAMPLE 2

Component A is applied to the bottom surface of a transparent glass ceramic plate of the type CERAN CLEARTRANS® (size 250×300 mm, thickness 4 mm) over the entire surface by screen printing and is baked in a continuous furnace at 750° C. for 15 min.

Component A comprises 25% of borosilicate glass ($T_s$ of about 620° C.) and 75% of black pigment (Cu—Cr spinel), with grain sizes of D50<5 µm.

Component A baked in this manner has a layer thickness of 1.6 µm, a smooth haptic perception, is dense (non-porous), dark gray (L=30.8; a=−0.4; b=0.2) and semi-transparent.

Subsequently, component B2 is applied on component A by screen printing (77 mesh screen), likewise to the entire surface area, and is dried at 230° C. for 90 min. A gray silicone paint is used as the component B2. The resulting gradient layer including component A and component B2 is smooth, dense, opaque, and dark gray (L=30.1; a=−0.7; b=−0.8).

The so produced plate with the gradient layer satisfies the requirements for a cooktop with a short-term temperature load of up to 500° C.

In detail, component B2 may have a composition as follows:

60-80 wt % polydimethylsiloxane
10-20 wt % black pigment, in particular selected from the group comprising (Cr,Fe)(Ni,Mn) spinel; $Cu(Cr,Fe,Mn)_2O_4$ spinel (black 28); $Co(Cr,Fe)_2O_4$ (black 27); (Ni,Fe)(Cr,Fe)$O_4$ spinel (black 30); $(Fe,Mn)_2O_3$ (black 33); (Fe,Mn)(Fe,Mn)$_2O_4$ spinel (black 26); and $(Cu,Cr)O_x$ (black 28)
10-20 wt % $TiO_2$ (white pigment)
5-15 wt % graphite with a D90 value between 5 and 20 µm. (both synthetic and non-synthetic).

EXAMPLE 3

Component A is applied to the bottom surface of a transparent glass ceramic plate of the type CERAN CLEARTRANS® (size 250×300 mm, thickness 4 mm) over the entire surface by screen printing (180 mesh screen) and is then dried.

Component A comprises 90% of borosilicate glass ($T_s$ of about 755° C.) and 10% of an effect pigment (Merck, type Xirallic®-crystal silver), mixed with screen printing medium.

Subsequently, component B is applied onto component A by screen printing (140 mesh screen), also to the entire surface area, and is dried at 825° C. for 10 min.

Component B comprises 30% of zinc-borosilicate glass ($T_s$ of about 575° C.) and 70% of a black pigment (Fe—Ni—Cr spinel), grain sizes D50<5 μm.

A black silicone paint as described in Example 1 is used as a component C(=B1).

This paint is printed using a 77 mesh screen, and is then dried at 230° C. for 45 min. The resulting gradient layer including components A, B, and C is smooth, dense, and, when viewed from the upper side, black with glitter effect.

Component A may also be produced using borosilicate glasses of different composition with varying contents of effect pigments (e.g. 1-10%). In this way, the visual appearance may be changed, e.g. as black with gold glitter or black with stainless steel color glitter.

The gradient layers so produced satisfy the requirements for a cooktop with a short-term temperature load of up to 500° C.

EXAMPLE 4

A sol-gel paint (preparation described in published patent application WO2010/081531 A1) including 25% of effect pigment (Merck, type Iriodin®; particle size <25 μm) is applied to the bottom surface of a transparent glass ceramic plate of the type CERAN CLEARTRANS® (size 250×300 mm, thickness 4 mm) over the entire surface thereof by screen printing, 140 mesh screen, in form of geometric patterns and labeling, and is dried at 150° C. for 10 min to obtain a layer thickness of 8 μm. Subsequently, the gradient layer is produced in the manner as described in Example 1.

The resulting plates are deep black (L=26.6; a=−0.2; b=−0.7) when viewed from the upper side (viewer side), with bright contrasting patterns, markings and lettering (L=63; a=−1.7; b=2.1).

The plates thus produced meet the requirements for a cooktop with a short-term temperature load of up to 500° C.

EXAMPLE 5

Component A is applied to the bottom surface of a plurality of transparent glass ceramic plates of the type CERAN CLEARTRANS® (size 250×300 mm, thickness 4 mm) over the entire surface by screen printing (100 mesh screen), and is baked at 725° C. for 10 min.

Component A comprises 35% of zinc-borosilicate glass ($T_s$ of about 575° C.) and 65% of a white pigment ($TiO_2$), with grain sizes of D50<5 μm.

Component A baked in this manner has a layer thickness of 3 μm, a smooth haptic perception, is dense (non-porous), beige (L=63.69; a=−0.3; b=5.61) and semi-transparent.

Subsequently, components B1, B2, and B3 are applied to different plates over component A by screen printing, likewise to the entire surface area thereof and using a 77 mesh screen, and then are dried at 200° C. for 45 min.

The resulting plate with the gradient layer including component A and component B1 is smooth, dense, and gray (L=48; a=−2; b=−3) when viewed from the upper side; the resulting plate with the gradient layer including component A and component B2 is smooth, dense, and light gray (beige gray) (L=59; a=−1.6; b=1.4). The resulting plate with the gradient layer including component A and component B3 is smooth, dense, and beige (significantly more opaque (less transparent) than component A alone) (L=69; a=−0.7; b=5.5). The plates with the gradient layers so produced satisfy the requirements for a cooktop with a short-term temperature load of up to 500° C.

In detail, component B3 may have a composition as follows:
60-80 wt % of polydimethylsiloxane
0-40 wt % of $TiO_2$ (white pigment)
0-10 wt % of effect pigment iriodin.

EXAMPLE 6

Component A is applied to the bottom surface of a transparent glass ceramic plate of the type CERAN CLEARTRANS® (size 250×300 mm, thickness 4 mm) over the entire surface thereof by screen printing, and is baked at 800° C. for 30 min.

Component A comprises 70% of borosilicate glass ($T_s$ of about 820° C.) and 30% of a black pigment (Cr—Fe—Ni—Mn spinel), grain sizes of D50<5 μm.

Component A baked in this manner has a layer thickness of 4.2 μm, a smooth haptic perception, is dense, non-porous, gray (L=33.1; a=−1; b=−0.9) and semi-transparent. Subsequently, component B1 is applied on component A by screen printing (77 mesh screen), likewise to the entire surface area thereof, and is dried at 200° C. for 90 min. The resulting gradient layer including component A and component B1 is smooth, dense, black (L=27.5; a=−0.2; b=−0.9) and glossy.

It may occur that a bead of adhesive which is applied to the bottom surface, is visible from the upper side. Therefore, it is also possible to first apply component A of Example 1 and then the layers according to Example 6.

EXAMPLE 7

Component A is applied to the bottom surface of a transparent, non-ceramized glass plate of the type CERAN CLEARTRANS® (size 250×300 mm, thickness 4 mm) over the entire surface thereof by screen printing (180 mesh screen). Component A comprises 55% of borosilicate glass ($T_s$ of about 820° C.) and 45% of a black pigment (Cr—Fe—Ni—Mn spinel), grain sizes of D50<5 μm, mixed with screen printing medium.

During ceramization of the substrate, component A is baked at the same time and thereafter has a layer thickness of 1.4 μm, a smooth haptic perception, is dense, non-porous, gray, and semi-transparent.

Subsequently, component B1 is applied on component A by screen printing (77 mesh screen), likewise to the entire surface area thereof, and is dried at 200° C. for 90 min. The resulting gradient layer including component A and component B1 is smooth, dense, and glossy black.

EXAMPLE 8 (COMPARATIVE EXAMPLE)

Component B1 is applied to the bottom surface of a transparent glass ceramic plate of the type CERAN CLEARTRANS® (size 250×300 mm, thickness 4 mm) over the entire surface thereof by screen printing (77 mesh screen) and is then dried at 200° C. for 90 min. Component B1 obtained in this manner has a layer thickness of 20 μm and is dark gray black. When this plate is subjected to a thermal load of 500° C. it discolors (becomes lighter). Massive cracks are produced in the silicone layer, where the light is scattered more strongly. The resulting color difference between the undamaged silicone layer and the silicone layer damaged by thermal action is not acceptable, i.e. the requirements for a cooktop are not met. Hence, the material of component B1 is not suitable for a single layer coating.

EXAMPLE 9

Component A is applied to the bottom surface of a transparent glass ceramic plate of the type CERAN CLEARTRANS® (size 250×300 mm, thickness 4 mm) over the entire surface thereof by screen printing (140 mesh screen), and is baked at 725° C. for 10 min. Component A comprises 40% of zinc borosilicate glass ($T_s$ of about 575° C.) and 30% of a blue pigment (Co—Al—Cr spinel) and 30% of a green pigment (Co—Zn—Ti—Cr spinel), grain sizes D50<5 μm.

Component A baked in this manner has a layer thickness of 2.1 μm, a smooth haptic perception, is dense and non-porous, turquoise, and semi-transparent.

Subsequently, component B2 which forms the further layer is applied on component A by screen printing, likewise to the entire surface area thereof.

A gray silicone paint is used as the component B2. This paint is printed using a 54 mesh screen, and is then dried at 230° C. for 45 min.

The resulting gradient layer consisting of component A and component B2 is smooth, opaque turquoise, and glossy.

The gradient layer so produced comprising the materials of component A and component B2 meets the requirements for a cooktop with a short-term temperature load of up to 500° C.

EXAMPLE 10

Component A is applied to the bottom surface of a heat-resistant borosilicate glass of the type Borofloat 33 of a thickness of 3 mm over the entire surface by screen printing (100-40 mesh screen). Component A comprises 40% of bismuth-borosilicate glass ($T_s$ of about 600° C.) and 60% of a black pigment (Cu—Cr spinel). Baking is performed at 680° C. for 10 min. The resulting layer is almost black, dense, and has a layer thickness of 3.4 μm.

A black silicone paint is used as the component B1, for example that described in published patent application DE 10 2010 031 866 A1. This paint is printed using a 77 mesh screen, and is then dried at 200° C. for 45 min.

The resulting gradient layer including component A and component B1 is smooth, dense, and glossy black.

EXAMPLE 11

In the examples mentioned, additional substrates were printed with the semi-transparent component A and baked. Then one half of the substrate was printed on the rear so as to become opaque (as described in the examples above), and the other half was printed on the rear with a transparent pigment-free silicone resin and then dried. Even with the transparent rear printing, the display below the plate is not visible in the off state, but when switched on the display is easy to read. In order to keep the color contrast as small as possible between the opaque part and the semi-transparent display area, the transparent silicone resin was also colored with organic dyes, e.g. in Example 1 with black dye Orasol® RLi, or in Example 9 with phthalocyanine-based dyes.

Further Optional Embodiments:

For cooktop applications, for example, in addition to the bottom surface the upper surface may also be decorated.

The invention enabled to provide a deep black coating of high temperature resistance, consisting of components A (first layer) and B (further layer).

Layers were in particular provided with the following color values in the Lab color space:

| Layer | L | a | B |
|---|---|---|---|
| Component A | 29.9 | −0.4 | 0.4 |
| Component B | 30.8 | −0.25 | −1.2 |
| A + B | 26.7 | −0.1 | −0.7 |

It is in particular apparent that the lightness L of the layer system consisting of components A and B is less than 27, whereas when applied alone component A has a lightness of 29.9 and component B has a lightness of 30.8. Thus, only a combination of the two components that make up the first layer and the further layer results in a deep black color appearance.

Figure 2:
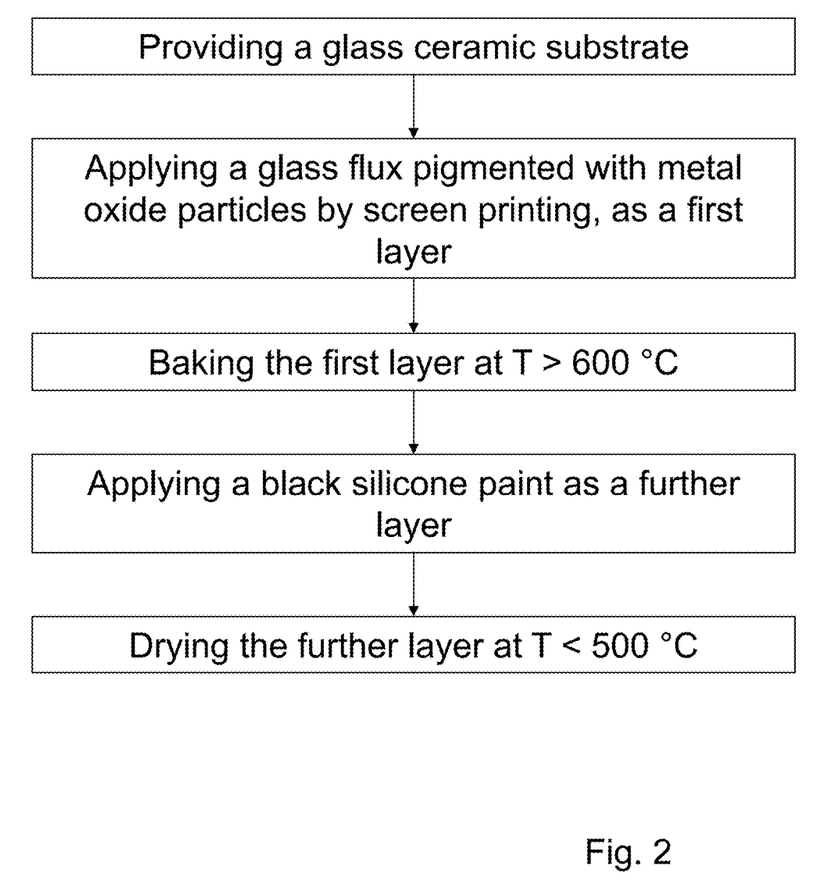
FIG. 2 shows a schematic flow chart of the essential method steps.

FIG. 2 shows a schematic flow chart of the essential method steps.

First, a glass ceramic substrate is provided, then a first layer is applied which consists of a layer material comprising metal oxide particles for pigmentation purposes and a glass flux material.

This first layer is baked at a temperature of more than 600° C., so that a dense textured layer is produced.

Then, a black silicone paint is applied as a further layer. This silicone paint is dried at a temperature below 500° C.

Figure 3:
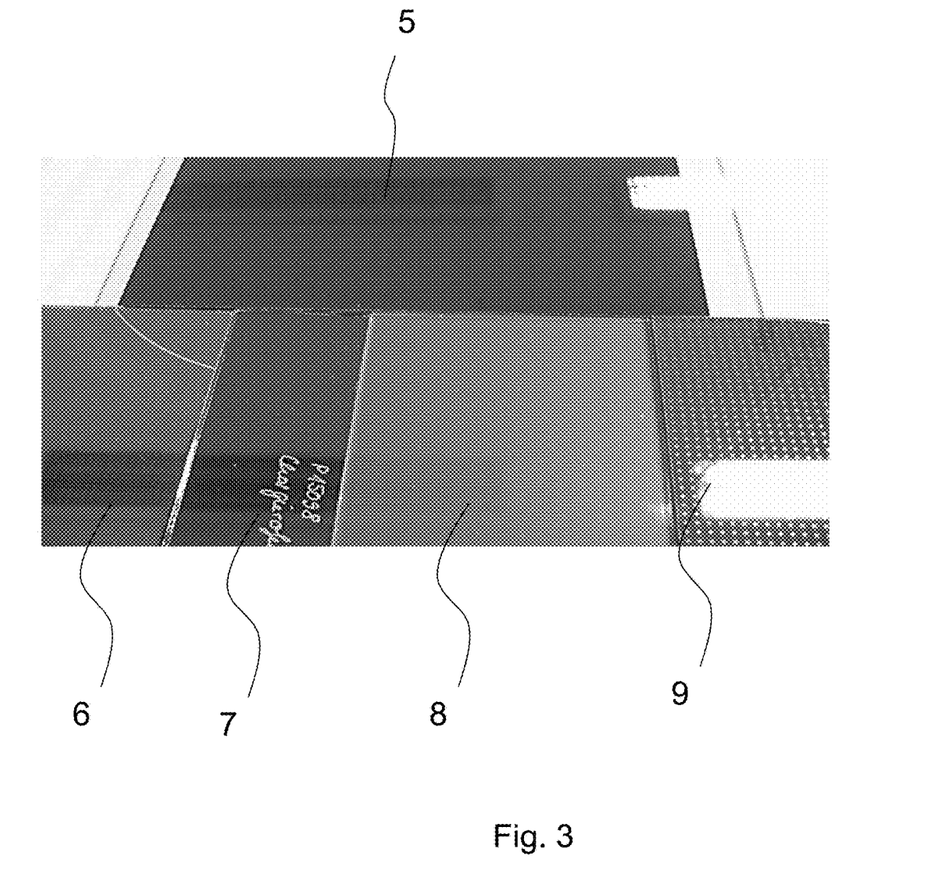
FIG. 3 shows photographs of different samples of coated glass ceramic substrates according to the present disclosure.

FIG. 3 shows photographs of different samples of coated glass ceramic substrates. Samples 6, 8, and 9 are coated glass ceramic substrates having a dark coating such as available on the market.

It can be seen that the visual appearance is rather greyish.

Sample 7 is coated using a noble metal oxide. As can be seen, it has a brown-black color appearance. However, the application of such a coating is very expensive.

Sample 5 has been coated using a method according to the invention.

As can be seen, it has a deep black color appearance. Furthermore, the coating has a glossy reflective color appearance.

Figure 4:
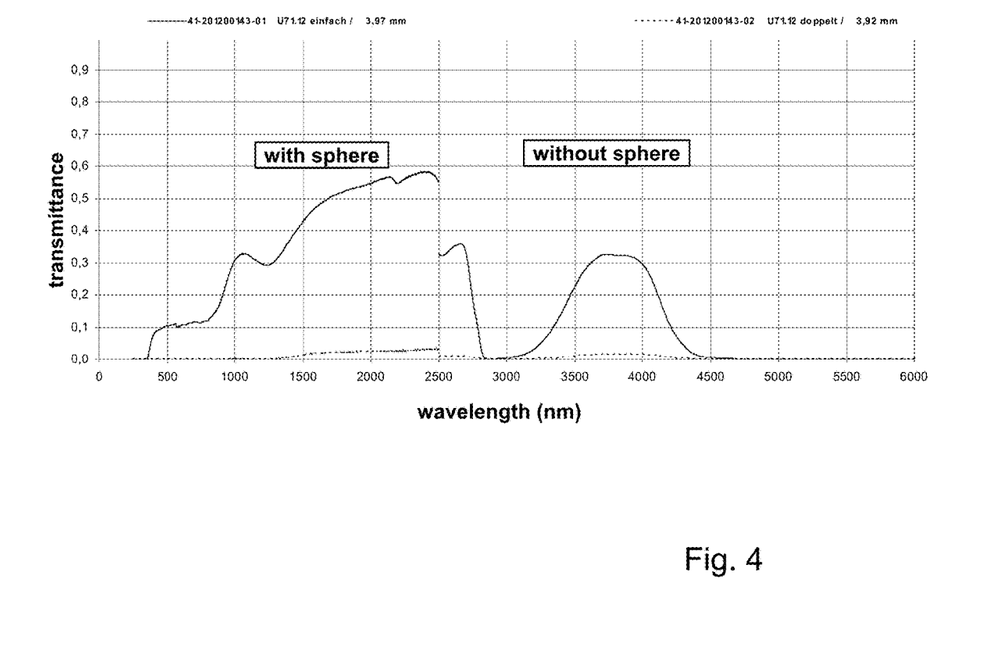
FIG. 4 shows the spectral transmittance curve of a glass ceramic substrate coated with component A according to the embodiment of Example 1 of the invention.

FIG. 4 shows the spectral transmittance curve of a glass ceramic substrate coated with component A according to the embodiment of Example 1 of the invention.

It can be seen that in the visible range spectral transmittance is less than 20%.

Figure 5:
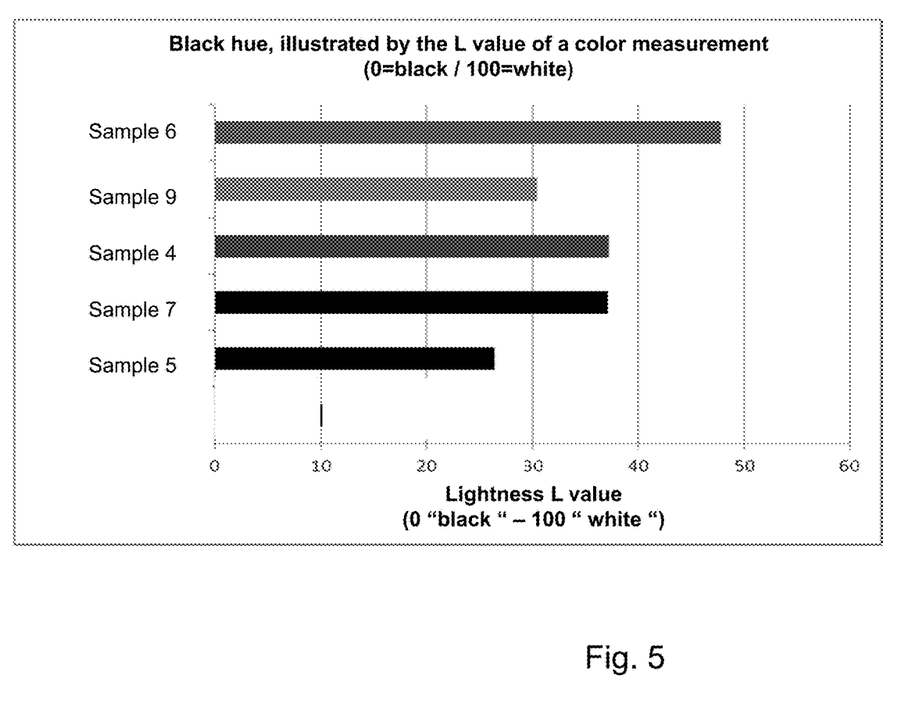
FIG. 5 illustrates the lightness value (L value) in the Lab system of the samples shown in FIG. 3.

FIG. 5 illustrates the lightness value (L value) in the Lab system of the samples shown in FIG. 3.

It can be seen that sample 5 which is the coating applied according to the invention has the lowest L value, which is even lower than the L value of sample 7 in which a noble metal oxide was applied.

Figure 6:
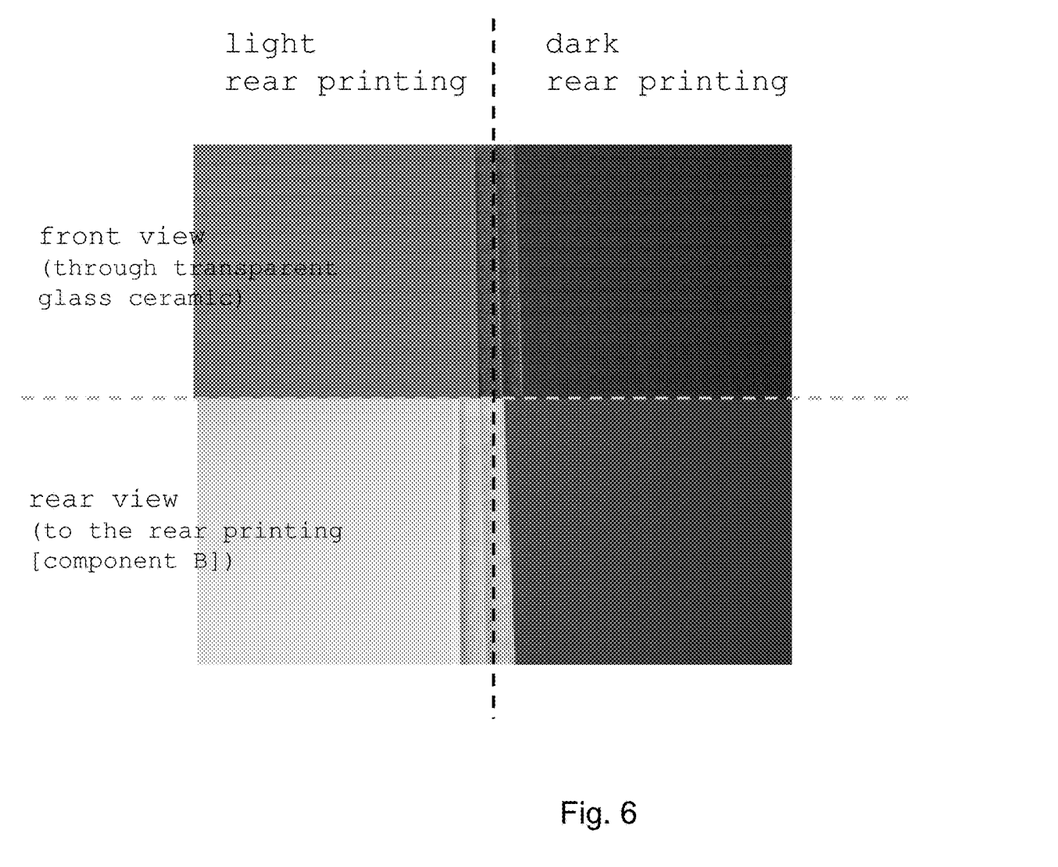
FIG. 6 illustrates the change in color location due to rear printing with different colors.

Referring to FIG. 6, the change in color location due to rear printing with different colors will be explained.

In this example, component A has a dark pigmentation.

It can be seen that when used as a bottom surface coating (front view) a gray color appearance is obtained together with light pigmented component B2.

FIGS. 7 to 10 show scanning electron micrographs of a glass flux based coating material for the first layer, which was baked at 680° C.

A highly textured layer can be seen, which due to the added particles has the desired high degree of texturing as intended.

Figure 7:
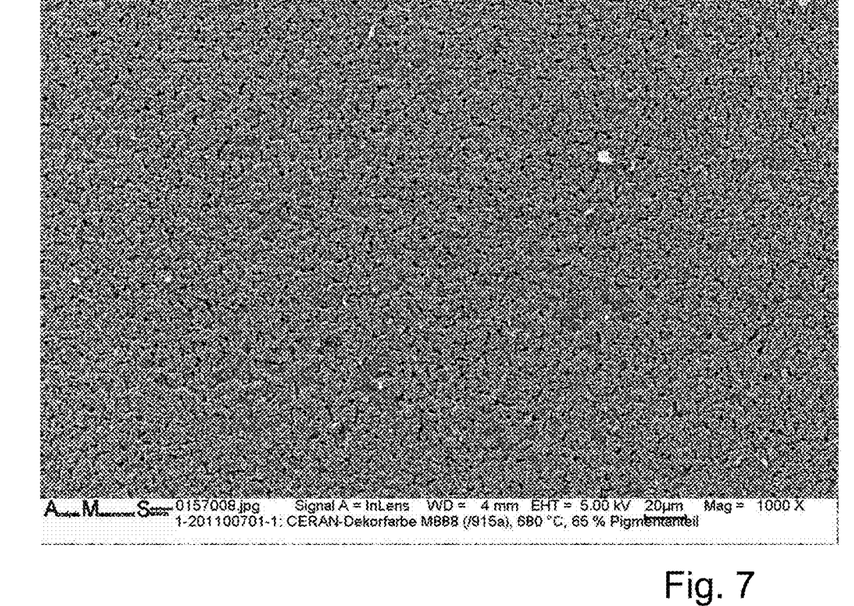
FIG. 7 shows a scanning electron micrograph, from a top view, of a glass flux based coating material for the first layer which was baked at 680° C. at 1,000 times magnification.
Figure 8:
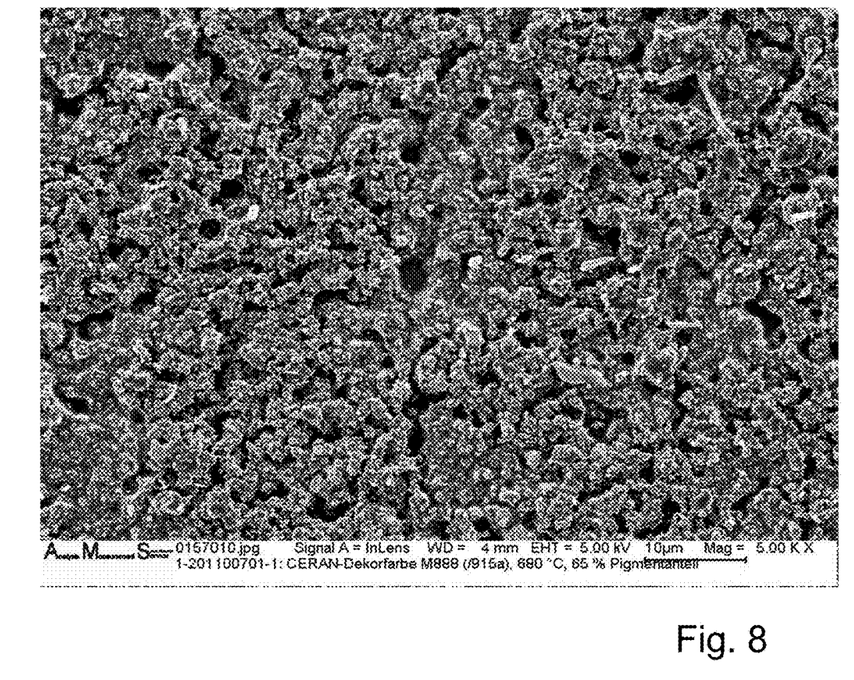
FIG. 8 shows a scanning electron micrograph, from the top view, of the glass flux based coating material of FIG. 7 at 5,000 times magnification.
Figure 9:
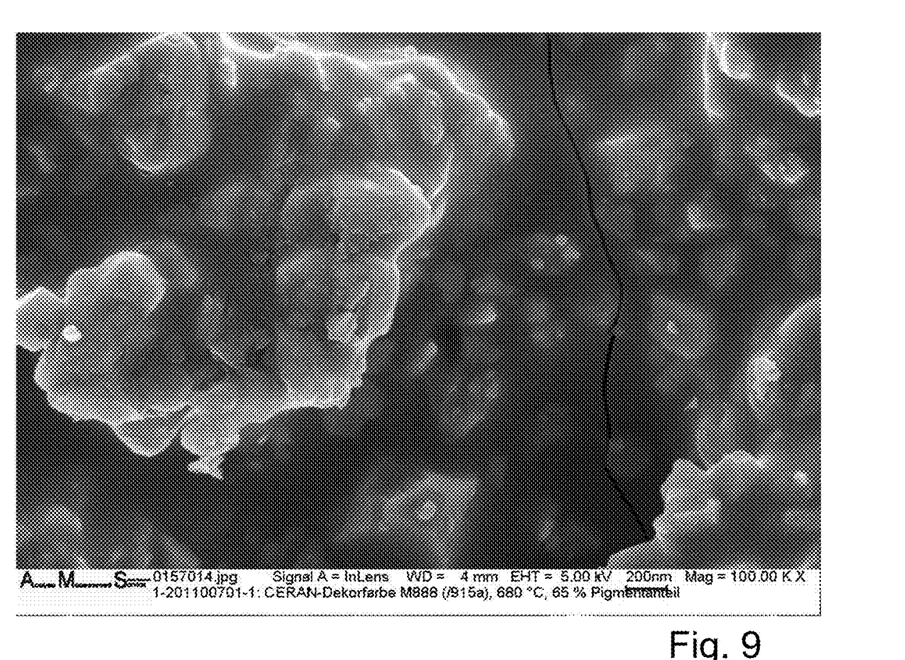
FIG. 9 shows a scanning electron micrograph, from the top view, of the glass flux based coating material of FIG. 7 at 100,000 times magnification.

FIG. 9 shows a micrographs with high magnification as compared to the scale illustrated in FIGS. 7 and 8.

In FIG. 9 cracking in the baked layer can be seen. Surprisingly it has been found that this cracking has no significant visible impact on the visual appearance of the layer when the latter is combined with a further layer which fills the texture of the first layer.

Moreover, cracking even appears to increase the temperature stability of the coating system.

Figure 10:
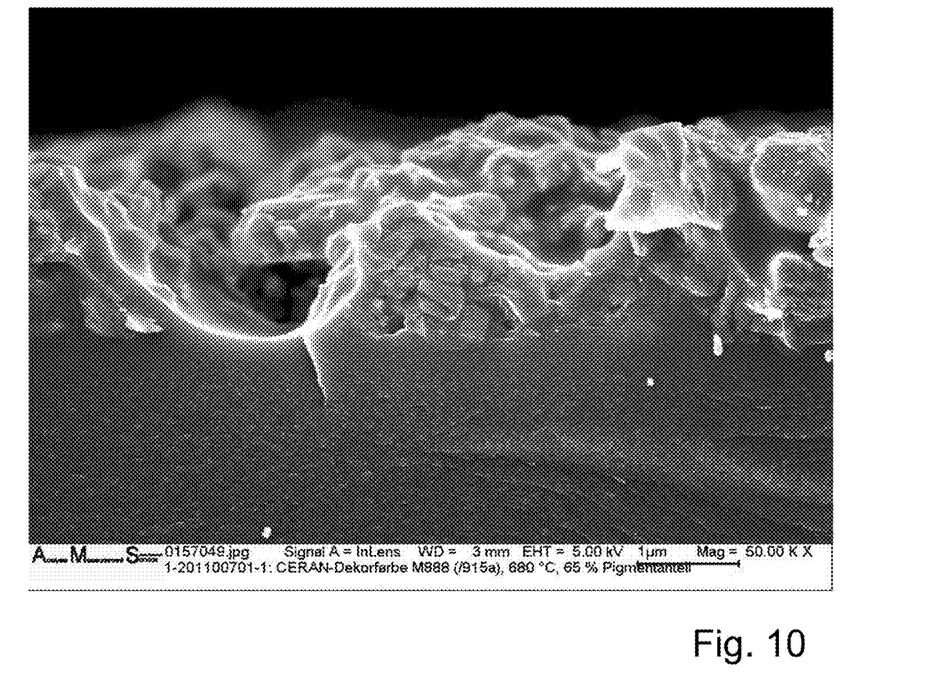
FIG. 10 shows a scanning electron micrograph, from a sectional view, of the glass flux based coating material of FIG. 7 at 50,000 times magnification.

FIG. 10 shows a sectional view of the layer. It can be seen how the substrate merges into the coating, even the individual pigment particles are clearly visible. In the bottom of one valley, a significant cracking can be seen.

Figure 11:
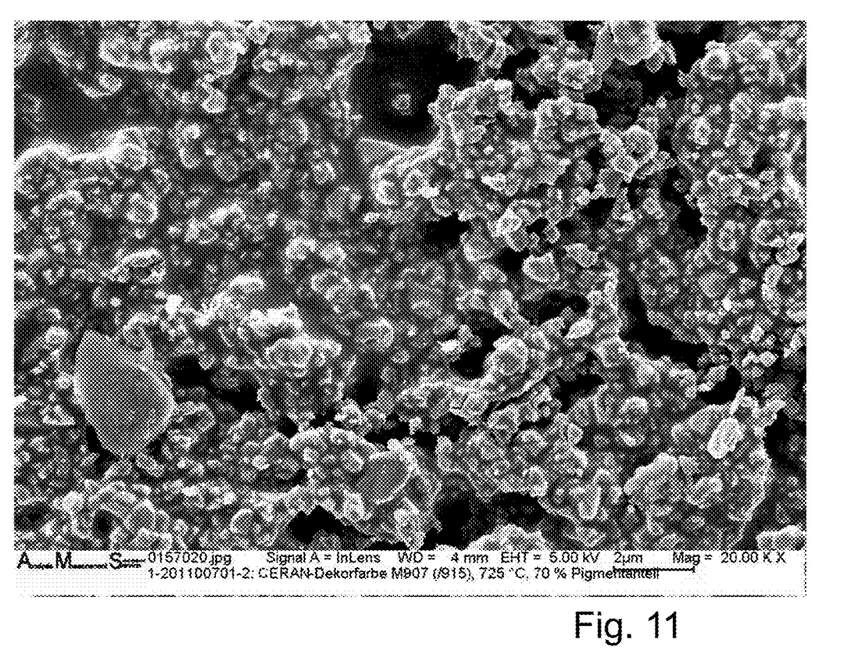
FIG. 11 shows a scanning electron micrograph, from a top view, of a first layer with a pigment content of 70%, which was baked at 725° C. at 20,000 times magnification.
Figure 12:
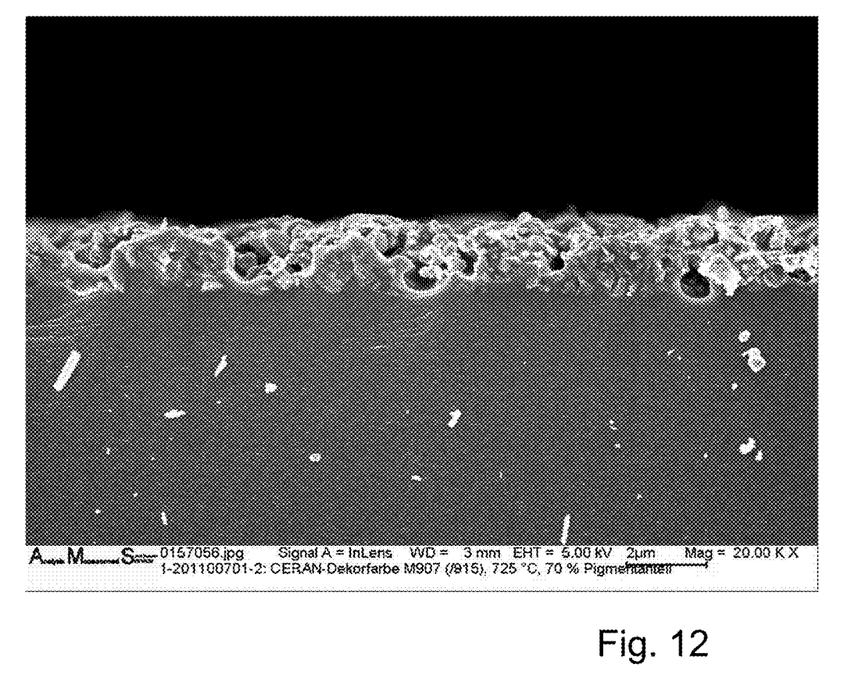
FIG. 12 shows a scanning electron micrograph, from a sectional view, of the first layer of FIG. 11 at 50,000 times magnification.

FIGS. 11 and 12 show scanning electron micrographs of a first layer with a pigment content of 70%, which was baked at 725° C. The result is roughly comparable, although the texture depth of this layer is further increased.

The sectional view of FIG. 12 illustrates particularly well that the layer is almost free of pores. Therefore, the layer material itself has a very low porosity after baking.

The first layer should be baked so fast that a formation of a porous structure due to the added particles is largely avoided.

Figure 13:
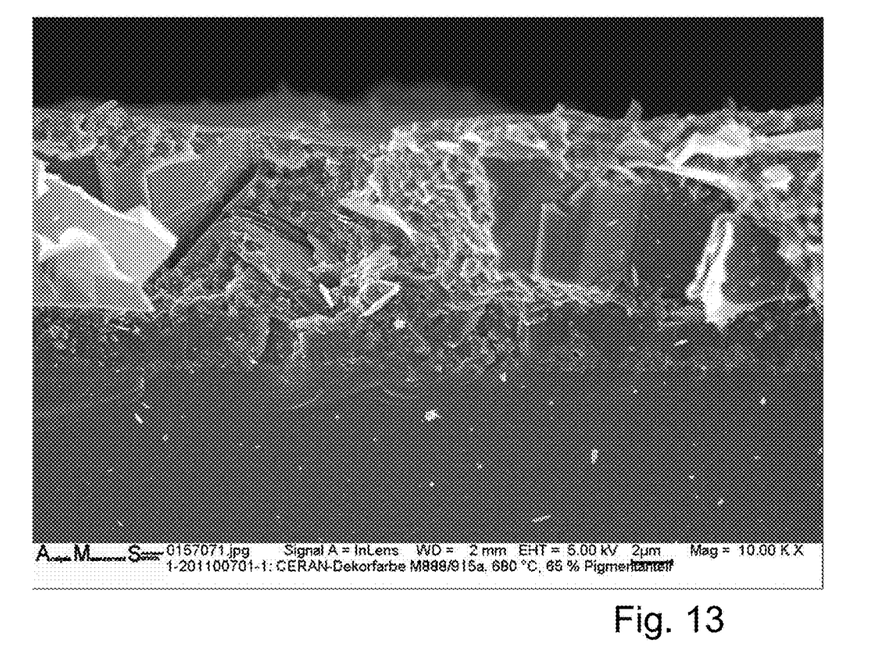
FIG. 13 shows a scanning electron microscope cross-sectional view of a first layer with a pigment content of 65% baked at 680° C. at 10,000 times magnification.
Figure 14:
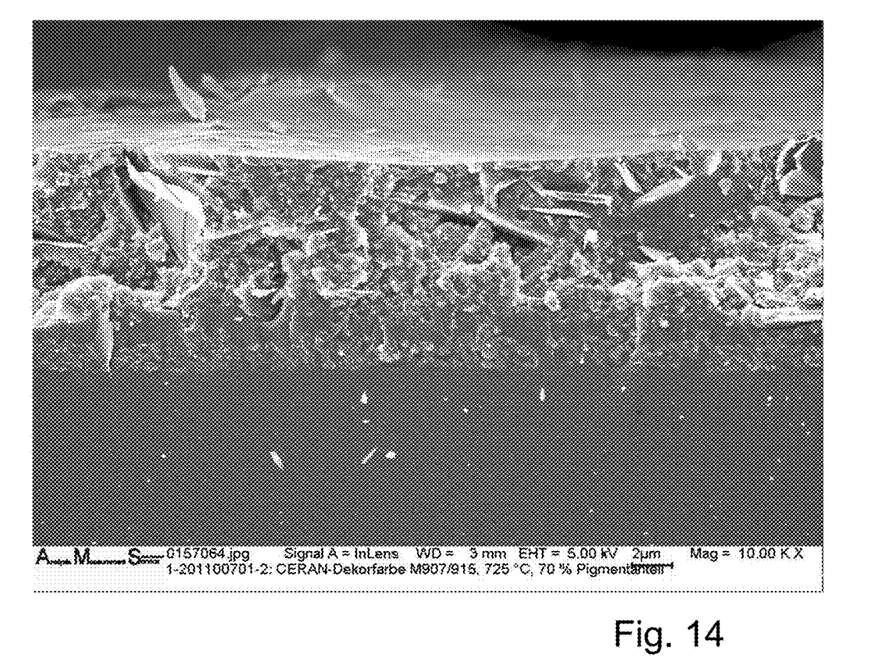
FIG. 14 shows a scanning electron microscope cross-sectional view of a first layer with a pigment content of 70% baked at 725° C. at 10,000 times magnification.

FIGS. 13 and 14 show scanning electron microscope cross-sectional views of a layer material which has been filled with a silicone paint as the second layer.

Here, FIG. 13 relates to the first layer with a pigment content of 65% baked at 680° C., and FIG. 14 relates to the first layer with a pigment content of 70% baked at 725° C.

It can be seen in the scanning electron micrographs that the first layer is sealed and a fairly smooth surface is obtained.

Furthermore, the components of the first and the further layer are hardly distinguishable in this scanning micrograph, the material gradually merges into one another.

The invention permits, in a particularly simple and cost-effective manner, to produce high-temperature stable colored decorative coatings for cooktops.

What is claimed is:

1. A method for applying a decorative coating to a glass or glass ceramic substrate, comprising the steps of:
    applying a first layer and baking the first layer at a temperature so that cracks arise, the first layer having a textured surface, wherein the first layer is applied as a glass flux and wherein the first layer includes pigment particles; and
    applying a second layer onto the first layer, wherein the second layer fills the textured surface at least partially, so that material of the first layer merges into material of the second layer.

2. The method as in claim 1, wherein the first layer is baked, whereby the glass flux particles melt while the pigment particles remain intact.

3. The method as in claim 2, wherein the pigment particles are embedded by the glass flux.

4. The method as in claim 1, wherein the material of the second layer comprises pigments or colorants.

5. The method as in claim 4, wherein the material of the first or second layer comprises pigments in a proportion of more than 50% in percent by weight.

6. The method as in claim 1, wherein at least the first layer comprises metal oxide particles as the pigment particles and a further inorganic material.

7. The method as in claim 1, wherein at least the first layer comprises pigment particles having of a mean particle size of more than 0.25 µm.

8. The method as in claim 1, wherein the second layer is an at least partially polymeric layer.

9. The method as in claim 8, wherein the partially polymeric layer is select from the group consisting of a polysiloxane, polysilsesquioxane, polyurethane, epoxy-functionalized silicone resin, polyester-functionalized silicone resin, and a sol-gel.

10. The method as in claim 1, wherein the first layer applied has a maximum texture depth from 0.1 to 5 µm.

11. The method as in claim 10, wherein the maximum texture depth of the first layer is more than 40% of the maximum thickness of the first layer.

12. The method as in claim 1, wherein the first layer applied is a layer having a closed porosity of less than 30 %.

13. The method as in claim 1, wherein the first layer is baked at a temperature of more than 500° C.

14. The method as in claim 1, wherein the pigment particles are added to the material of the first layer.

15. The method as in claim 1, wherein the first and second layers exhibit a lightness L in the Lab color space of more than 29.0 when individually applied, and wherein the first and second layers exhibit a lightness L of less than 28.0.

16. The method as in claim 1, wherein the step of applying the first layer comprises applying the first layer to a further textured layer so that the further textured layer is below the first layer.

17. The method according to claim 1, wherein the first layer includes filler particles.

18. A method for applying a decorative coating to a glass or glass ceramic substrate, comprising the steps of:
    applying a first layer and baking the first layer at a temperature so that cracks arise, the first layer having a textured surface, wherein the first layer is applied as a glass flux and wherein the first layer includes filler particles; and
    applying a second layer onto the first layer, wherein the second layer fills the textured surface and cracks at least partially so that material of the first layer merges into material of the second layer.

19. A method for applying a decorative coating to a glass or glass ceramic substrate, comprising the steps of:
    applying to the substrate a glass flux including pigment particles and/or filler particles;
    baking the glass flux including the pigment particles and/or filler particles to form a first layer having a closed porosity of less than 5% and a textured surface; and
    applying a second layer onto the first layer so that the second layer fills the textured surface and fills any cracks produced in the first layer by the baking so that material of the first layer merges into material of the second layer.

* * * * *